United States Patent [19]
Florence

[11] Patent Number: 5,148,157
[45] Date of Patent: Sep. 15, 1992

[54] SPATIAL LIGHT MODULATOR WITH FULL COMPLEX LIGHT MODULATION CAPABILITY

[75] Inventor: James M. Florence, Richardson, Tex.

[73] Assignee: Texas Instruments Incorporated, Dallas, Tex.

[21] Appl. No.: 590,405

[22] Filed: Sep. 28, 1990

[51] Int. Cl.[5] .............................................. G09G 3/34
[52] U.S. Cl. .................................. 340/783; 359/392; 359/318
[58] Field of Search ........... 340/783, 763, 764, 825.27; 350/6.5, 6.6, 486, 487, 374, 269; 358/206, 208; 330/4.3; 359/392, 391, 317, 318, 259, 277, 279

[56] References Cited

U.S. PATENT DOCUMENTS

| | | | |
|---|---|---|---|
| 3,886,310 | 5/1975 | Guldberg et al. | 350/360 |
| 4,229,732 | 10/1980 | Hartstein et al. | 340/764 |
| 4,420,897 | 12/1983 | Castleberry | 350/486 |
| 4,661,809 | 4/1987 | Anderson et al. | 340/783 |
| 4,793,699 | 12/1988 | Tobuhara | 350/487 |
| 4,954,789 | 9/1990 | Sampsell | 350/6.6 |

OTHER PUBLICATIONS

Brown, B. R. and Lohmann, A. W. "Complex Spatial Filtering with Binary Masks", *Applied Optics*, Jun. 1966, pp. 967–969.

Kast et al., "Implementation of Ternary Phase Amplitude Filters using a Magnetooptic Spatial Light Modulator," *Applied Optics*, Mar. 15, 1989, pp. 1044–1046.

Hansche et al., "Quad-Phase-Only Filter Implementation," *Applied Optics*, Nov. 15, 1989, pp. 4840–4844.

*Primary Examiner*—Alvin E. Oberley
*Assistant Examiner*—Regina Liang
*Attorney, Agent, or Firm*—Julie L. Schneider; James C. Kesterson; Richard L. Donaldson

[57] ABSTRACT

It is possible to control the amplitude and phase modulation of light independently and simultaneously. The invention described here details how to do so by dividing a picture element into smaller modulating elements, providing independent addressing for each element, setting the necessary angle for each element and then resolving them into the picture element. The invention also show one embodiment of the invention.

5 Claims, 4 Drawing Sheets

SPATIAL LIGHT MODULATOR WITH FULL COMPLEX LIGHT MODULATION CAPABILITY

BACKGROUND OF THE INVENTION

1. Field of the invention

The present invention relates to spatial light modulators, more particularly, to full complex light modulators.

2. Description of the Related Art

Spatial light modulators (SLMs) are devices used to control the distribution of light in an optical system. Spatial light modulators are divided into one- or two-dimensional arrays of modulation elements called pixels, or picture elements, that represent the smallest addressable unit within the device. The SLM pixel is used to modify either the amplitude or the phase of the light distribution within the optical system.

In practice, the light modulation characteristics of most prior art SLMs are coupled combinations of amplitude and phase changes. The modulation characteristic of a pixel is controlled by a single applied signal, either an electrical voltage, current or incident optical intensity level, so the amplitude and phase characteristics of the pixel can not be independently set.

There are numerous applications, especially in optical information processing, in which controlling amplitude and phase independently is essential. Phase modulation is essential since most of the signal information is contained in the phase terms. The additional control of amplitude provides means for rejecting noise in the filter plane for improved system performance.

Four major types of modulators are presently being used for phase modulation; liquid crystal, photoretractive, magnetooptic, and deformable mirror. All have coupled phase and amplitude modulation characteristics.

Liquid crystals allow for phase and amplitude modulation, but phase modulation has extremely narrow ranges for the electric fields applied for uniform realignment, making it hard to control. Amplitude modulation is also difficult since the nonuniform realignment causing the amplitude modulation also contributes to phase modulation, resulting in a phase-amplitude coupled modulation.

Photorefractive modulators work for phase-only modulation only at extremely high voltages. Birefringence caused in nonuniform alignment produces amplitude modulation. But since photorefractive, like liquid crystal, modulates by a change in the refractive index, phase modulation accompanies amplitude modulation.

Magnetooptic modulators produce a binary change in the polarization of light, but are hard to control in operation. Kast, et al., in their article in *Applied Optics*, Mar. 15, 1989, describe a method for ternary operation of magnetooptic modulators, but it has a very limited range of amplitude- or phase-only modulations, none of which are independently controlled.

Present deformable mirror devices could be effective if the resolution of the optical system was fine enough to resolve the mirror element separate from the background. But, the normal setting for resolution of optical systems is the Nyquist frequency, causing the mirror to be mixed with the background. Amplitude modulation results from the interference between the two distributions.

Two other methods of phase-only modulation have been used. The first method was introduced by Brown and Lohmann in *Applied Optics*, 1966. Their technique, detour phase, requires very tight system alignment and limited field-of-view for the phase encoding approximations to be valid. The second was introduced by Hansche, et al., in their article in *Applied Optics*, Nov. 15, 1989. Their approach allows for different amplitudes to be produced, but requires a lowered resolution in the optical system.

SUMMARY OF THE INVENTION

A method for full complex light modulation is described. Full complex light modulation allows the modulation of a signal with independent control of phase and amplitude.

The method described uses a standard picture element. The picture element is then divided into a number of smaller modulating elements. Each modulating element is provided with its own circuitry for addressing. The net phase angle, $\Phi$, and the desired resultant amplitude, A, must be selected. Through a series of calculations using A and $\Phi$, a number of angles can be found. These angles, $\theta_1$, $\theta_2$, etc. are for the individual modulating elements.

The addressing circuitry for the individual modulating elements is then activated in such a way as to cause the modulation at the angle $\theta_x$. The light signal is then directed to the picture element and its individual modulating elements. The final step in the process occurs when the optical system scans the modulating elements and resolves them as if they were the whole picture element.

The preferred embodiment shown uses a deformable mirror device (DMD) as the picture element. A flexure beams DMD is cut into two smaller flexure beam DMDs. The addressing circuitry in this case is electrodes, which are located underneath each half of the picture element. The angles, $\theta_1$, and $\theta_2$, are caused when a voltage is applied to the electrodes. The value of the voltage applied determines the value of the angle. The preferred embodiment shows only two modulating elements but it is possible to use this method for more than two angles.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
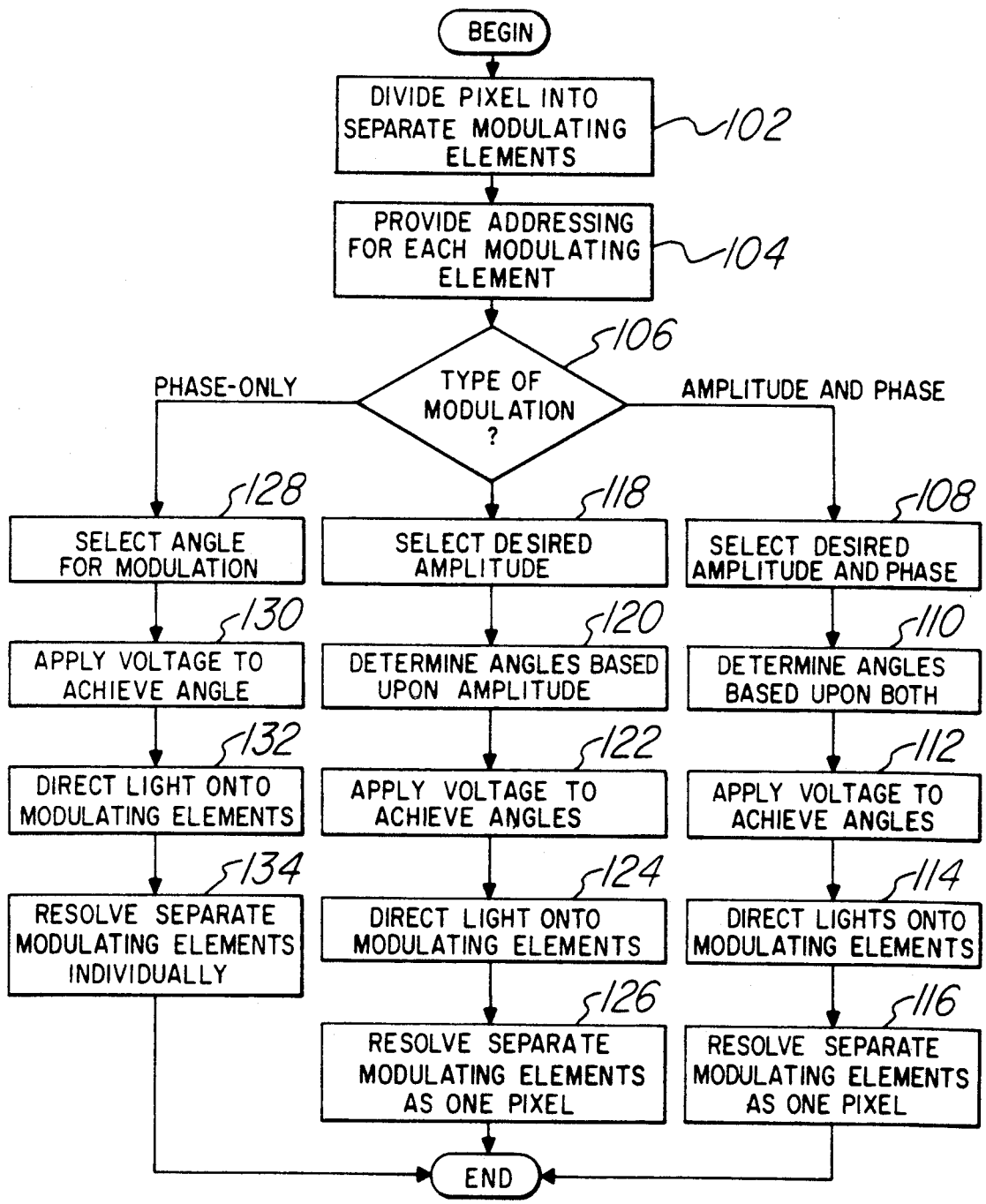
FIG. 1 shows the flow chart of the process for full complex light modulation.

The flowchart for the process of full complex light modulation is illustrated in FIG. 1. In step 102, the pixel is divided into however many modulating elements are desired within a pixel. Step 104 provides for addressing circuitry for each modulating element within the pixel, so each is individually addressable. Step 106 is the point at which the type of modulation must be selected.

If amplitude and phase modulation is desired, it is possible to perform both simultaneously. The process continues in this case to step 108.

In this step, the desired amplitude, A, and net phase angle, $\Phi$, must be selected. Once those two variables are set, the angles for the individual modulating elements must be determined, in step 110. The complete analytical description of the optical distribution transmitted by, or reflected by, the full complex pixel is given by equation (1):

$$p(x,y) = [b + me^{j\theta_1}]\text{rect}\left[\frac{x}{w_x}, \frac{y - \frac{W}{4}}{w_y}\right] + [b + me^{j\theta_2}]\text{rect}\left[\frac{x}{w_x}, \frac{y + \frac{W}{4}}{w_y}\right]; \quad (1)$$

where $w_x$ and $w_y$ are the widths of the modulating elements in the horizontal and vertical direction, W is the width of the entire square pixel region, and $\theta_1$ and $\theta_2$ are the phase setting of the individual modulation.

With the optical system resolution set to pass the 0,0 diffraction order Nyquist passband for array elements of width W, the net response of this pixel is determined by equation (2):

$$r(x,y) = p(x,y) * \text{sinc}\left[\frac{x}{W}, \frac{y}{W}\right]. \quad (2)$$

where the asterisk represents a two-dimensional convolution. This equation represents a complicated spatial distribution that cannot be simplified. However, the distribution is essentially a two-dimensional sinc function of width slightly greater that 2W and a peak complex amplitude given by equation (3):

$$Ae^{j\Phi} = b + me^{j\theta_1} + b + me^{j\theta_2} \quad (3),$$

where A and $\Phi$ are the amplitude and phase values of the net pixel response resulting from the coherent mixing of the two phase modulator responses.

At any specific net phase value $\Phi$, there is a maximum possible net amplitude, A. The maximum value occurs when the two modulator phase settings are equal, $\theta_1 = \theta_2 = \theta$ giving:

$$A_{max} = 2\sqrt{b^2 + m^2 + 2mb\cos\theta}. \quad (4)$$

However, to specify this maximum value, it is first necessary to determine the proper phase setting $\theta$ to find the net phase angle $\Phi$. The geometrical analysis to make this determination is quite involved resulting in the following relationship $$\theta = \cos^{-1}\left[\frac{-mb[1 - \cos^2\Phi] \pm \sqrt{[m^4 + m^2b^2]\cos^2\Phi + m^2b^2\cos^4\Phi}}{m^2}\right]. \quad (5)$$

This expression gives two values for the phase angle $\theta$ corresponding to angles in the upper or lower half plane. The proper choice is the angle that lies in the same half plane as $\Phi$. The geometrical analysis again gives the prescription for specifying the phase settings, $\theta_1$ and $\theta_2$, to achieve the desired net amplitude and phase values, A and $\Phi$. These phase settings are $$\theta_1 = \phi_0 + \Delta\phi \quad (6),$$

$$\theta_2 = \phi_0 - \Delta\phi \quad (7);$$

where $$\phi_0 = \tan^{-1}\left[\frac{A\sin\phi}{A\cos\phi - 2b}\right], \quad (8)$$

and $$\Delta\phi = \cos^{-1}\left[\frac{\sqrt{A\cos\phi - 2b^2 + A\sin\phi^2}}{2m}\right]. \quad (9)$$

These formulas are the specific ones for two halves of a given pixel. It is possible to use this method of analysis for more than two angles.

Step 112 requires the application of the voltages in order to deflect the appropriate modulating elements to achieve the phase angles calculated in step 110. The voltage to achieve a certain angle can be found by the following relationship:

$$V = \sqrt{\frac{K\lambda\theta[4\pi d_o - \lambda\theta]^2}{64\pi^3\epsilon_o A}}, \quad (10)$$

where V is the applied voltage, K is the spring constant of the DMD hinge, $\theta$ is the angle of deflection, $d_0$ is the distance of the DMD from the electrode before deflection, $\lambda$ is the wavelength of the incident light, and $\epsilon_0$ is the electrical permittivity of free space.

Step 114 is the part of the process that an actual optical signal is applied to the set elements by the system. Step 116 allows all of the independently addressed modulating elements to be integrated into one pixel. In this context, integration is the actual scanning done by the optical system, where the individual elements are grouped back into the original pixel.

If amplitude-only modulation is desired, the process steps to 118. The modulated amplitude, A, is selected. Using equations 6, 7, 8, and 9, it is possible to again solve for the individual angles, $\theta_1$ and $\theta_2$, in step 120. The relationship for the voltage set out in equation 10 is again used to determine the amount of applied voltage necessary for the proper deflection and applied in step 122. Step 124 again requires the direction of light, and step 126 is the integration of the modulation elements into the original pixel.

For phase-only modulation, the process moves to step 128. The angle selected for phase modulation is the angle for the individual modulating elements. Using equation 10 to determine the proper voltage, all individual modulating elements are set to that angle in step 130. After directing the light onto the modulating elements in step 132, each individual piece of the original pixel is treated as its own pixel. For example, if there existed an original array of N×N pixels, and each pixel was divided into two modulating elements, the system would scan an array of N×2N pixels at step 134.

Figure 2:
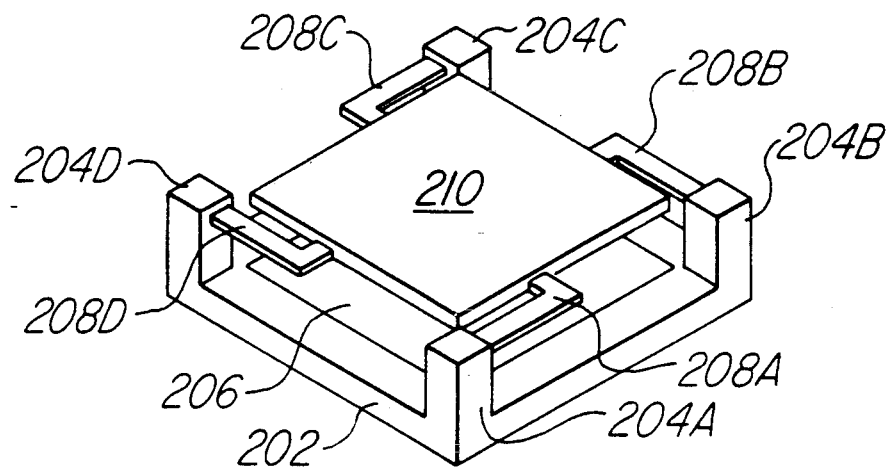
FIG. 2 shows a perspective view of a prior art flexure beam deformable mirror device (DMD)

FIG. 2 shows a prior art configuration of a flexure beam DMD. An addressing electrode 206 is built onto a substrate 202. A mirror element 210 is built onto a spacer covering the layer containing 206. The spacer layer is then etched away. This leaves a layer of support posts 204A, 204B, 204C, and 204D, with an gap between the mirror element 210 and the electrode 206. When a pre-determined voltage is applied to electrode 206, mirror element 210 is electrostatically attracted to it. The flexure hinges 208A, 208B, 208C, and 208D, allow the mirror to deflect downwards. Because all four corners are supported, the mirror deflects with a piston-like movement.

Figure 3:
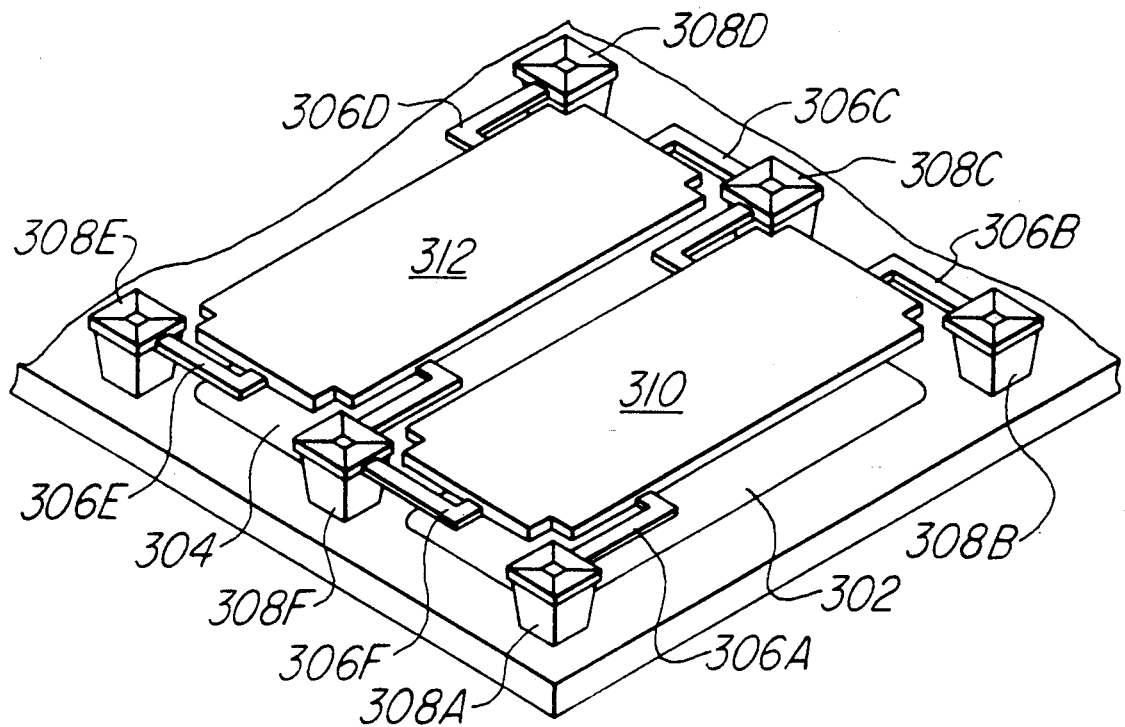
FIG. 3 shows a perspective view of a divided flexure beam DMD according to the present invention.

FIG. 3 illustrates a divided DMD with two individual modulating elements. If a voltage is applied to address electrodes 302, then mirror 310 will deflect downwards flexing on hinges 306A, 306B, 306C, and 306F. Mirror 312 will not deflect unless a voltage is applied to address electrode 302, allowing independent operation of the two mirror elements. As in FIG. 3, the flexure hinges 306A, 306B, 306C, 306D, 306E, and 306F, are supported by support posts 308A, 308B, 308C, 308D, 308E, and 308F, creating a gap between the mirror elements 310 and 312 and electrodes 302 and 304, respectively.

Figure 4:
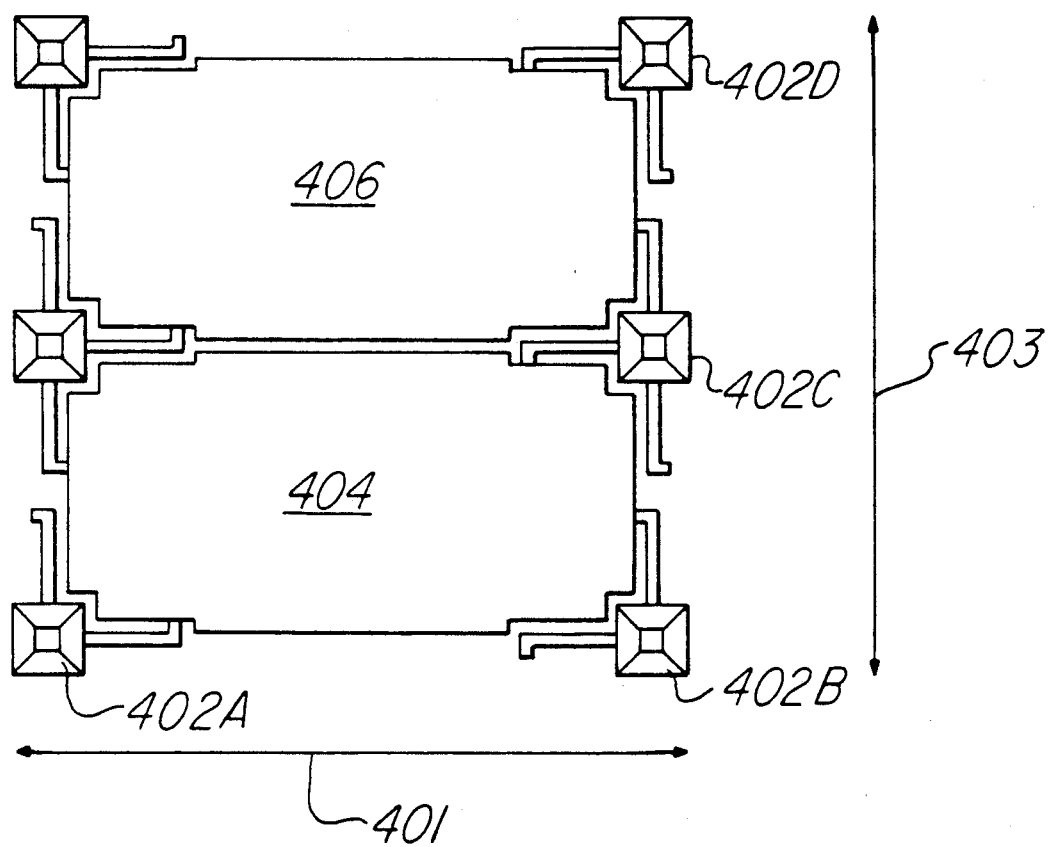
FIG. 4 is a top view of the divided DMD.

The top view of the divided pixel is shown in FIG. 4. The variables used in the above equations are shown. $W_x$ is along the horizontal axis, as indicated by the double-headed arrow 401, the distance from support post 402A to support post 402B. $W_y$ is along the vertical axis, indicated by the double-headed arrow 403, either from support post 402B to 402C, or from support post 402C to support post 402D. In this case, the pixel was divided horizontally into two parts, so there are two $w_y$ to one $w_x$. Mirror elements 404 and 406 are individually addressable underneath the mirror surface, as seen in the perspective drawing of FIG. 3. The preferred embodiment has $w_x$ equal to about 50 μm. $W_y$ would be about half of that, about 25 μm. Since $w_x$ is the same as the side length W, the active area of an undivided pixel in this case would be 2500 μm². Due to loss of area from the gap between the two mirrors, support posts and hinges, the active area is actually about 2125 μm². An advantage of this embodiment is that the divided pixel still has eighty-five percent of its original active area.

Figure 5:
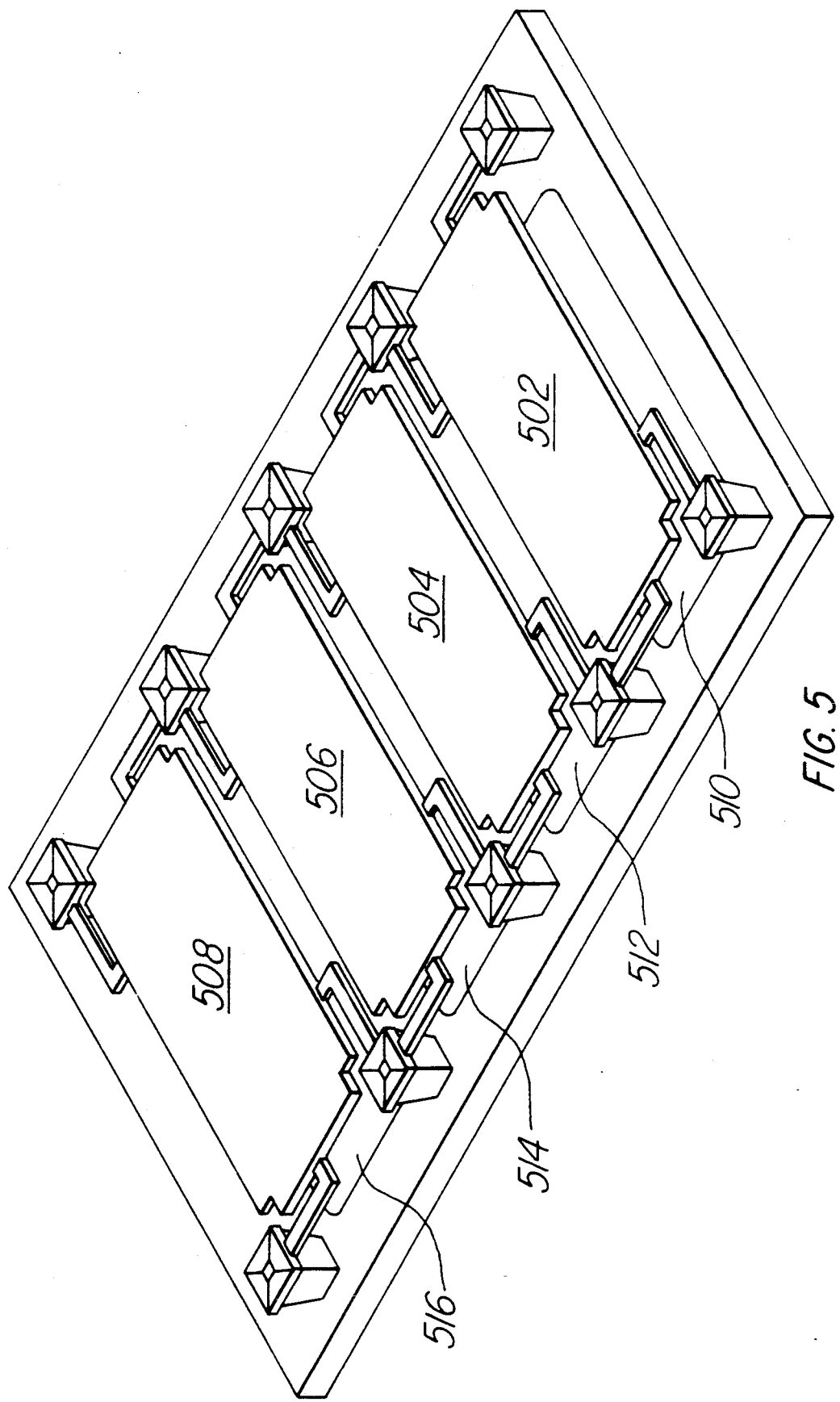
FIG. 5 shows one example of a DMD divided into more than two modulating element.

FIG. 5 shows an example of one possible other division of a pixel. The pixel is divided into two individual elements, which are in turn divided into two pieces. The mirror 502 has addressing electrode 510, and each other modulating element has a corresponding element, making all of them individually addressable.

Thus, although there has been described to this point particular embodiments of spatial light modulators for full complex modulation which use DMDs, which have been divided into halves, it is not intended that such specific references be considered as limitations upon the scope of this invention except in-so-far as set forth in the following claims.

We claim:

1. A method for full complex modulation of light comprising the following:
   a) dividing a picture element into a number of modulating elements;
   b) providing addressing circuitry for each of said modulating elements;
   c) selecting a net phase and amplitude of modulation;
   d) calculating angles to achieve said net phase and said amplitude of modulation;
   e) addressing said modulating elements to achieve said angles for independent control of said amplitude and net phase in the picture element response; and
   f) resolving said modulation elements as said picture element.

2. The method of claim 1, wherein:
   a) said addressing circuitry is made up of activation electrodes, one electrode corresponding to one modulating element.

3. The method of claim 1, wherein:
   a) said addressing of said modulating elements consists of applying a perdetermined voltage to an electrode; and
   b) locating said electrode directly under said modulating element.

4. A spatial light modulator, comprising:
   a) a plurality of picture elements formed in a layered structure, each pixel being divided in half along a common horizontal axis, said layer structure further comprising:
      i) a substrate;
      ii) a reflecting layer divided into said plurality of said picture elements, said picture elements being suspended over a well;
      iii) electrodes in said well, such that one electrode corresponds to one half of each said picture element being divided in half; and
   b) electrical addressing circuitry such that each said half is independently addressable for full complex modulation.

5. The modulator of claim 4, wherein:
   a) said modulator is divided into two halves;
   b) spacers are positioned at either end of the gap between the two halves;
   c) said halves are independently deflectable providing the application of an electrostatic force; and
   d) said electrostatic force is applied by activation of respective electrodes under each of said halves.

* * * * *